Aug. 27, 1929.  D. W. SMITH  1,725,835
PIE MACHINE
Filed Dec. 7, 1925   2 Sheets-Sheet 1

Witnesses:
Wayne Hudson
John E. Titus

Inventor:
Dennis W. Smith
By Rummler & Rummler
Attys.

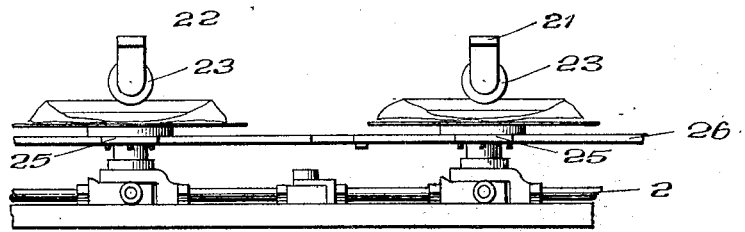
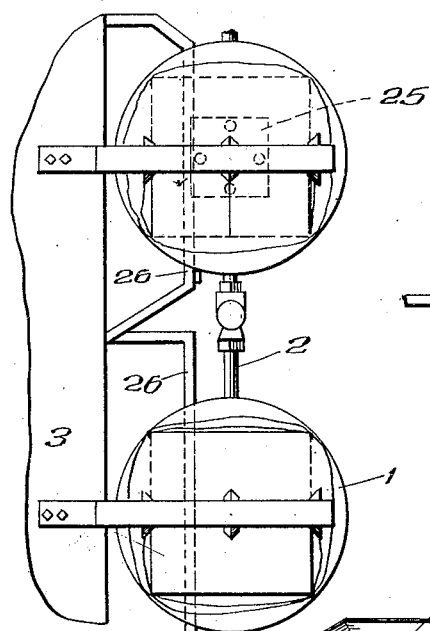
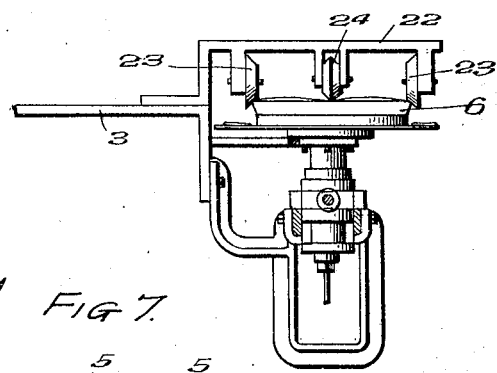
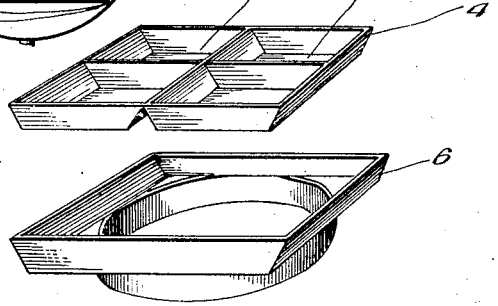

Patented Aug. 27, 1929.

1,725,835

UNITED STATES PATENT OFFICE.

DENNIS W. SMITH, OF WILMETTE, ILLINOIS, ASSIGNOR TO COLBORNE MANUFACTURING COMPANY, OF CHICAGO, ILLINOIS, A CORPORATION OF ILLINOIS.

PIE MACHINE.

Application filed December 7, 1925. Serial No. 73,725.

The main objects of this invention are to provide an improved form of pie making machine for handling a group of pies at each operating station; to provide a machine of this kind having improved means for forming a group of pies on a single crust and then separating the pies of each group; and to provide a machine of this kind which is particularly adapted for making individual pies for vending machines.

An illustrative embodiment of the invention is shown in the accompanying drawings in which:

Fig. 4 is taken on line 4—4 of Fig. 1.

Fig. 5 is an elevation looking from the right of Fig. 4.

Fig. 6 is a plan view of Fig. 3.

Fig. 7 shows the multiple pie tin.

Fig. 8 shows the pie tin holder.

In the machine illustrated an endless train of pie support discs 1 are rotatably mounted in a suitable conveyer 2 and move in a horizontal plane along the sides and around the ends of the elongated machine frame 3.

Figure 1:
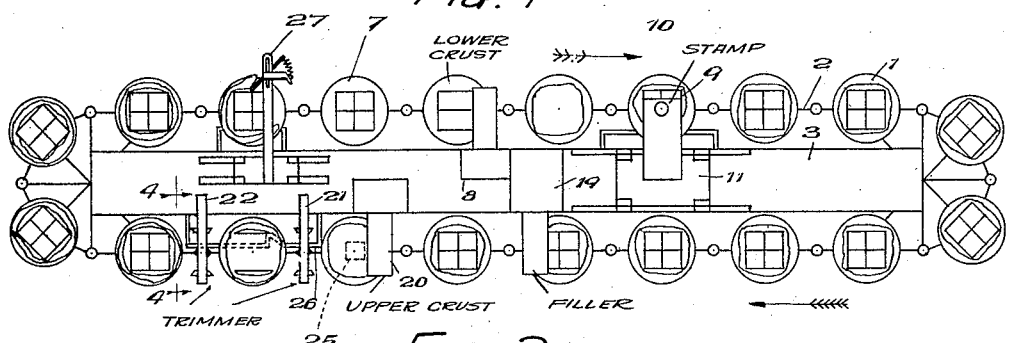
Figure 1 is a diagrammatic plan view of the pie making machine.
Figure 2:
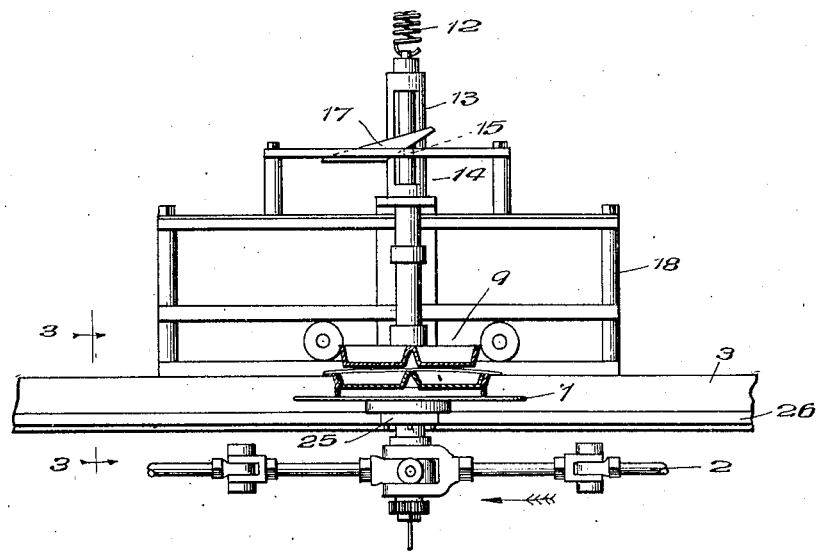
Fig. 2 is an elevation of the device for pressing the lower crust into place.
Figure 3:
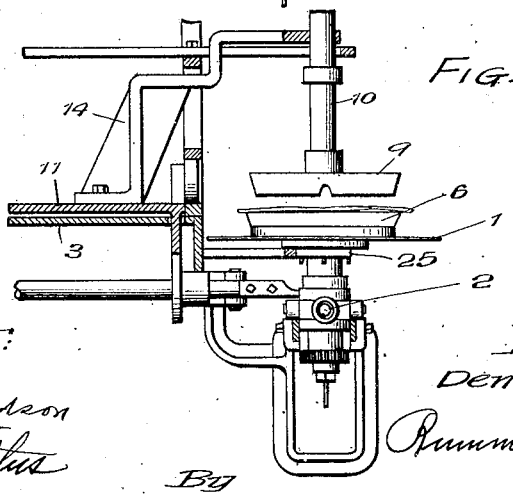
Fig. 3 is taken on line 3—3 of Fig. 2.

Pie tins 4 (Fig. 7) are provided divided into compartments 5 for four individual square pies in checker arrangement. These tins are placed in the holders 6 which are centrally secured on the support discs of the carrier 1 at the point marked 7 in Figure 1. The carrier 1 moves under the lower crust forming device 8 which rolls out and deposits, in a well known manner, a single crust which is large enough to completely cover the entire pie tin 4.

In some cases it is then desirable to press the lower crust down into the compartments by means of a die member or stamp 9. The die 9 is mounted on the shaft 10 which is slidably mounted in the carriage 11. For moving the die in cooperative relation with each moving pie support, the carriage 11 is guided on the frame 3 and caused to reciprocate so that it moves a short distance with each succeeding pie support 1. The mechanism for moving the carriage as described is more fully shown in my Patent No. 1,595,428 issued Aug. 10, 1926, and need not be shown herein. The shaft 10 is supported by the spring 12 in the slotted hub 13 of the bracket 14 which is secured to the carriage 11. For raising and lowering, the shaft 10 is provided with cam rollers 15 which are engaged, during the movement of the carriage, by stationary cams 17 carried in the frame superstructure 18. During the coordinated movement of the die and a pie support, each support is held from rotating in the same manner as will be described hereinafter in connection with the trimming device.

The supports after passing the die 9 then pass around the end of the machine and move past the filler supplying device 19 which injects the proper amount of filling into each of the compartments 5. Then a large upper crust is rolled out at 20 and laid over the whole group of pies. The four pies are now formed in upper and lower crusts and the crusts are next trimmed to separate the pies and trim off the overlying surplus.

Mounted on the frame 3 and overhanging the moving pie supports are two brackets 21—22 in each of which are mounted a row of trimming rollers 23, 23 and 24. The end rollers 23 are positioned to engage opposite outer edges of the pie tin 4 and the center roller 24 cuts the crust between the pies. When a pie carrier or holder approaches the first trimming element 21 the pie holder is positioned by being rotated in the conveyer so that one series of edges is parallel to the line of travel. This is accomplished by means of square cams 25, with pins, provided on each support which cooperate with stationary cam rails 26, having lugs. One edge of the cam then slides along the cam rail and prevents the pie support from turning while the trimming rollers are cutting in straight lines on the edges and between the pies. The mechanism for alining the pie holders is more fully shown and described in my Patent No. 1,595,427, issued August 10, 1926, and need not be shown herein.

After the group of pies passes the first trimming element it is rotated and alined by a similar lug and rail arrangement and is turned one quarter of a revolution so that the second row of rollers in the second trimming element 22 trims the remaining edges.

The surplus crust drops down onto the disc 1 and the pie tins with the four individual pies formed therein are removed from the holder 6. A scrap remover 27 scrapes the trimmings off from the disc 1 which is then ready for a new pie tin.

To briefly review the operation, a pie tin adapted for holding a group of pies in double parallel arrangement, or arranged in adjoining squares, is placed in the moving holders and a single lower crust is placed over the whole tin. Then the crust is pressed into the compartments of the pie tin and the filling put in place. The upper crust is laid over the tin completing the pies except for trimming which is accomplished by passing the pies under two rows of trimming rollers, turning the pies between the two rows.

While but one illustrative embodiment has been shown it is considered that omissions and alterations may be made without departing from the spirit of the invention.

I claim:

1. In combination in a pie making machine, a train of pie supports movable through a predetermined path, each of said supports being adapted to support a group pie tin having a plurality of pie forming depressions, means for laying a bottom crust over the group of depressions, means mounted on the machine and movable along with each support for stamping the crust down into said depressions, means for depositing the pie filling in the depressions as the supports are moved along, and trimming means for cutting the crust to separate the pies of each group.

2. In combination in a pie machine, a conveyer having a support adapted to support a group pie tin having a plurality of depressions for pies, means for laying a bottom crust over the pie tin, means for forming the crust into said depressions, means for depositing the pie filling in the depressions in the bottom crust, means for laying a top over the group of pies thus formed, and means for cutting the crusts of the pies on each support to separate the pies.

Signed at Chicago this 4th day of December, 1925.

DENNIS W. SMITH.